United States Patent
Gluck et al.

(10) Patent No.: US 9,785,358 B2
(45) Date of Patent: Oct. 10, 2017

(54) MANAGEMENT OF EXTENT CHECKING IN A STORAGE CONTROLLER DURING COPY SERVICES OPERATIONS

(71) Applicant: International Business Machines Corporation, Armonk, NY (US)

(72) Inventors: Olympia Gluck, Haifa (IL); Beth A. Peterson, Tucson, AZ (US); Kenneth W. Todd, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 14/996,592

(22) Filed: Jan. 15, 2016

(65) Prior Publication Data

US 2016/0132239 A1     May 12, 2016

Related U.S. Application Data

(63) Continuation of application No. 14/168,977, filed on Jan. 30, 2014, now Pat. No. 9,262,092.

(51) Int. Cl.
*G06F 12/00*     (2006.01)
*G06F 3/06*     (2006.01)
*G06F 11/14*     (2006.01)

(52) U.S. Cl.
CPC ............ *G06F 3/061* (2013.01); *G06F 3/065* (2013.01); *G06F 3/0617* (2013.01); *G06F 3/0683* (2013.01); *G06F 3/0689* (2013.01); *G06F 11/1456* (2013.01)

(58) Field of Classification Search
None
See application file for complete search history.

(56) References Cited

U.S. PATENT DOCUMENTS

| | | | |
|---|---|---|---|
| 6,240,467 B1 | 5/2001 | Beardsley et al. | |
| 6,880,102 B1 * | 4/2005 | Bridge | G06F 11/1076 714/6.12 |
| 6,973,586 B2 | 12/2005 | Petersen et al. | |
| 7,657,715 B2 | 2/2010 | Cammarata et al. | |
| 7,930,438 B2 * | 4/2011 | Hardy | G06F 13/102 709/250 |
| 8,214,341 B2 | 7/2012 | Bartfai et al. | |
| 8,560,578 B2 | 10/2013 | Mehra et al. | |
| 2009/0327367 A1 | 12/2009 | Mehra et al. | |
| 2010/0049926 A1 | 2/2010 | Fuente et al. | |

(Continued)

OTHER PUBLICATIONS

Office Action dated Jul. 30, 2015, pp. 11, for U.S. Appl. No. 14/168,977, filed Jan. 30, 2015.

(Continued)

*Primary Examiner* — Brian Peugh
(74) *Attorney, Agent, or Firm* — Rabindranath Dutta; Konrad Raynes Davda & Victor LLP (57) ABSTRACT

A storage controller receives a request to avoid extent conflict checking from a host application executing in a host that is coupled to the storage controller. In response to receiving a request, a host I/O process that executes in the storage controller to satisfy I/O requests from the host application opportunistically releases a track of an extent to a copy services process at an earliest point in time when the track of the extent is longer needed by the host I/O process and is needed by the copy services process.

20 Claims, 7 Drawing Sheets

(56) References Cited

U.S. PATENT DOCUMENTS

2012/0079222 A1     3/2012   Phelps et al.
2012/0324171 A1   12/2012   Benhase et al.
2015/0212739 A1     7/2015   Gluck et al.

OTHER PUBLICATIONS

Response dated Oct. 2, 2015, pp. 8, to Office Action dated Jul. 30, 2015, pp. 11, for U.S. Appl. No. 14/168,977, filed Jan. 30, 2015.
Notice of Allowance dated Oct. 23, 2015, pp. 8, for U.S. Appl. No. 14/168,977, filed Jan. 30, 2015.

* cited by examiner

MANAGEMENT OF EXTENT CHECKING IN A STORAGE CONTROLLER DURING COPY SERVICES OPERATIONS

CROSS-REFERENCE TO RELATED APPLICATIONS

This application is a continuation of application Ser. No. 14/168,977 filed on Jan. 30, 2014, now U.S. Pat. No. 9,262,092, which is incorporated by reference in its entirety.

BACKGROUND

1. Field

Embodiments relate to the management of extent checking during copy services operations

2. Background

A storage controller may manage a plurality of disks or other storage devices. A plurality of hosts may access data stored in the plurality of disks or other storage devices via the storage controller.

In certain situations, the disks or other storage may be organized logically into volumes having a plurality of extents, where each extent comprises a plurality of tracks in which data is stored. Generally the storage controller is responsible for managing the extents and prevent conflicts, etc., that may be caused when a plurality of processes perform input/output (I/O) operations with respect to a plurality of extents. The storage controller performs extent conflict checking while satisfying the I/O requests of the host applications or copy services operations that execute in the storage controller.

In certain situations, a host application may request the storage controller that extent conflict checking is not to be performed for a range of extents. For example, the host application may wish to avoid extent conflict checking within the range of extents in order to perform write operations or for other reasons. The storage controller attempts to satisfy such requests to avoid extent conflict checking that are sent by the host application.

SUMMARY OF THE PREFERRED EMBODIMENTS

Provided are a method, a system, and a computer program product in which a storage controller receives a request to avoid extent conflict checking from a host application executing in a host that is coupled to the storage controller. In response to receiving a request, a host I/O process that executes in the storage controller to satisfy I/O requests from the host application opportunistically releases a track of an extent to a copy services process at an earliest point in time when the track of the extent is longer needed by the host I/O process and is needed by the copy services process.

In certain embodiments, the host I/O process queries the copy services process to determine whether the copy services process needs the track of the extent.

In additional embodiments, in response to receiving an indication that the copy services process needs the track of the extent and determining that the track is no longer needed by the host I/O process, the host I/O process transfers the track to the copy services process for processing.

In further embodiments, by transferring tracks opportunistically from the host I/O process to the copy services process, an entire extent is not blocked while satisfying extent conflict checking within an extent range.

In certain embodiments, the storage controller manages a plurality of Count Key Data (CKD) disks that are logically represented as volumes, wherein each volume includes a plurality of extents, and wherein each extent includes a plurality of tracks.

In further embodiments, the request to avoid extent conflict checking from a host application is received via an addressing and control command that includes an extent range within which extent conflict checking is to be avoided.

In certain embodiments, the copy services command is a continuous mirror command that copies storage volumes from a first location to a second location.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain situations when copy services processes such as continuous mirror (e.g., Peer to Peer Remote Copy) operations are being performed by the storage controller, the storage controller may not be able to satisfy the request of the host application to avoid extent conflict checking for a range of extents because the copy services processes would have to wait too long to get access to extents. It should be noted that certain embodiments may be applicable to not only continuous mirror but also to other types of copy operations.

Certain embodiments provide a mechanism in which a host I/O process executes in the storage controller for satisfying host I/O requests. The host I/O process performs extent conflict checking, and periodically requests a copy services process as to whether the copy services process needs a track of an extent. If the copy service process responds that it needs the track, the host I/O process transfers the track to the copy services process at the time the host I/O process would normally have released the track.

As a result of changing the granularity of processing to tracks rather than keeping the granularity of processing at extents, the storage controller avoids blocking large extents or volumes, when a host application requests avoidance of extent conflict checking for a range of extents, and performance of the storage system is improved.

Exemplary Embodiments

Figure 1:
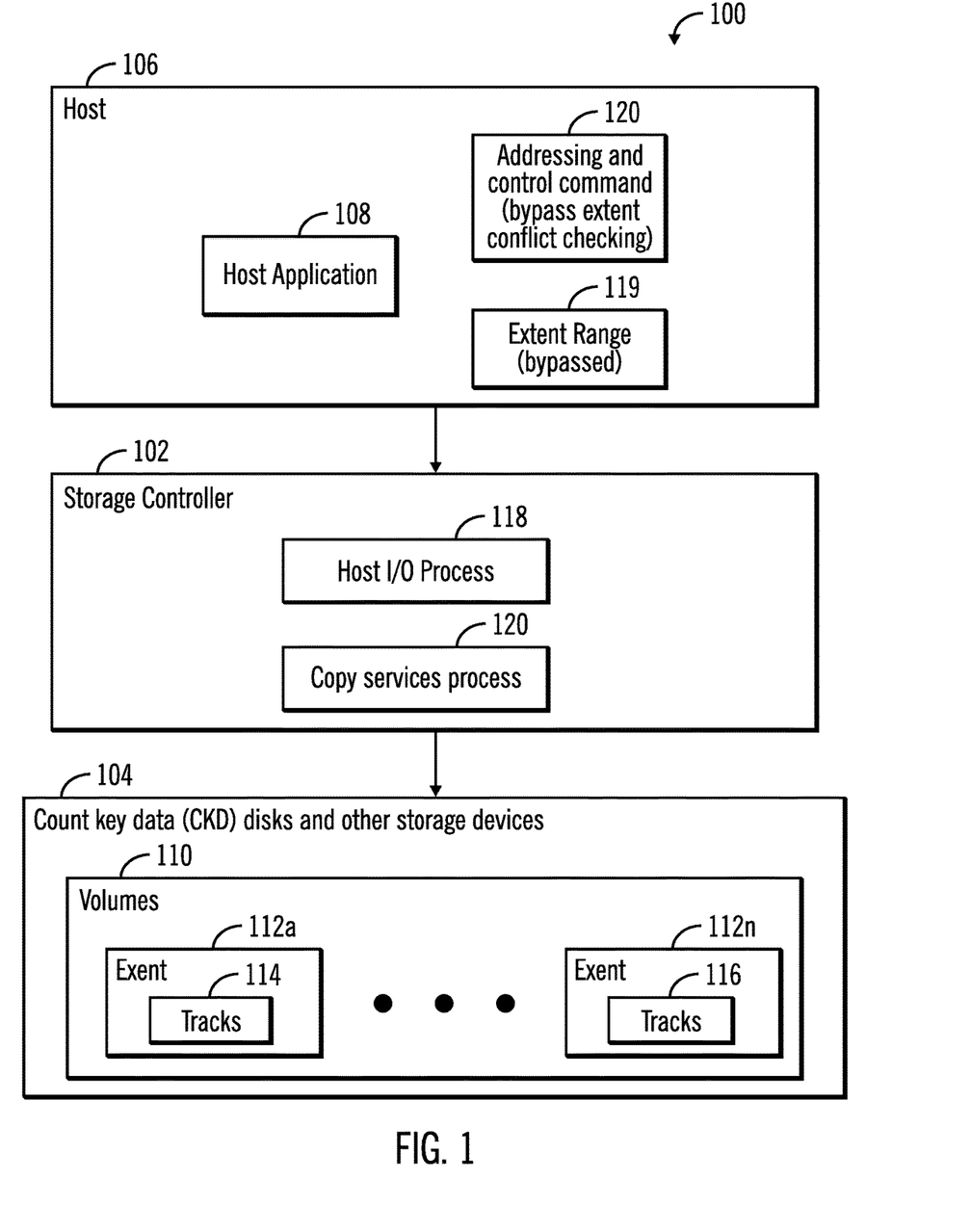
FIG. 1 illustrates a block diagram of a computing environment, in accordance with certain embodiments.

FIG. 1 illustrates a block diagram of a computing environment 100, in accordance with certain embodiments. In FIG. 1, a storage controller 102 controls a plurality of Count Key Data (CKD) disks and other storage devices 104. One or more hosts 106 are coupled to the storage controller 102.

The storage controller 102 and the hosts 106 may comprise any suitable computational devices known in the art, such as a mainframe computer, a midrange computer, a personal computer, a laptop, a telephony device, a server, a blade computational device, a processor, etc. The host 106, the storage controller 102, and the storage devices 104 may be included in a network and/or in a cloud computing environment.

The host 106 includes one or more host applications 108 that execute in the host 106. The host application 108 may use the storage controller 102 to perform input/output (I/O) with respect to the volumes 110 that are logical representations of the storage devices 104. Each volume 110 may comprise a plurality of extents 112a . . . 112n, where each of the plurality of extents include a plurality of tracks that store data. It may be noted that the extent size is much larger that the track size. As a result it may be undesirable to block entire extents for any process that executes in the storage controller 102 when tracks of the extents may be released as needed.

The storage controller 102 includes a host I/O process 118 that performs I/O operations requested by the host application 108. The storage controller 102 may also include a copy services process 120, such as a continuous mirror process (e.g., a Peer to Peer Remote Copy process). The copy services process 120 may copy volumes or extents from one location to another.

The host application 108 may request that conflict checking of extents be avoided for an extent range 119. An addressing and control command 120 sent from the host 106 may request the storage controller 102 to avoid extent conflict checking for the host application 108 whose I/O operations are performed by the host I/O process 118. The avoidance of extent conflict checking is referred to as bypass extent conflict checking or bypass extent checking.

In certain embodiments shown in FIG. 1, the host I/O process 118 opportunistically transfers tracks of extents to the copy services process 120, where the transferred tracks are needed by the copy services process 120 but are no longer needed by the host I/O process 118, while satisfying bypass extent conflict checking requests from the host 106.

Figure 2:
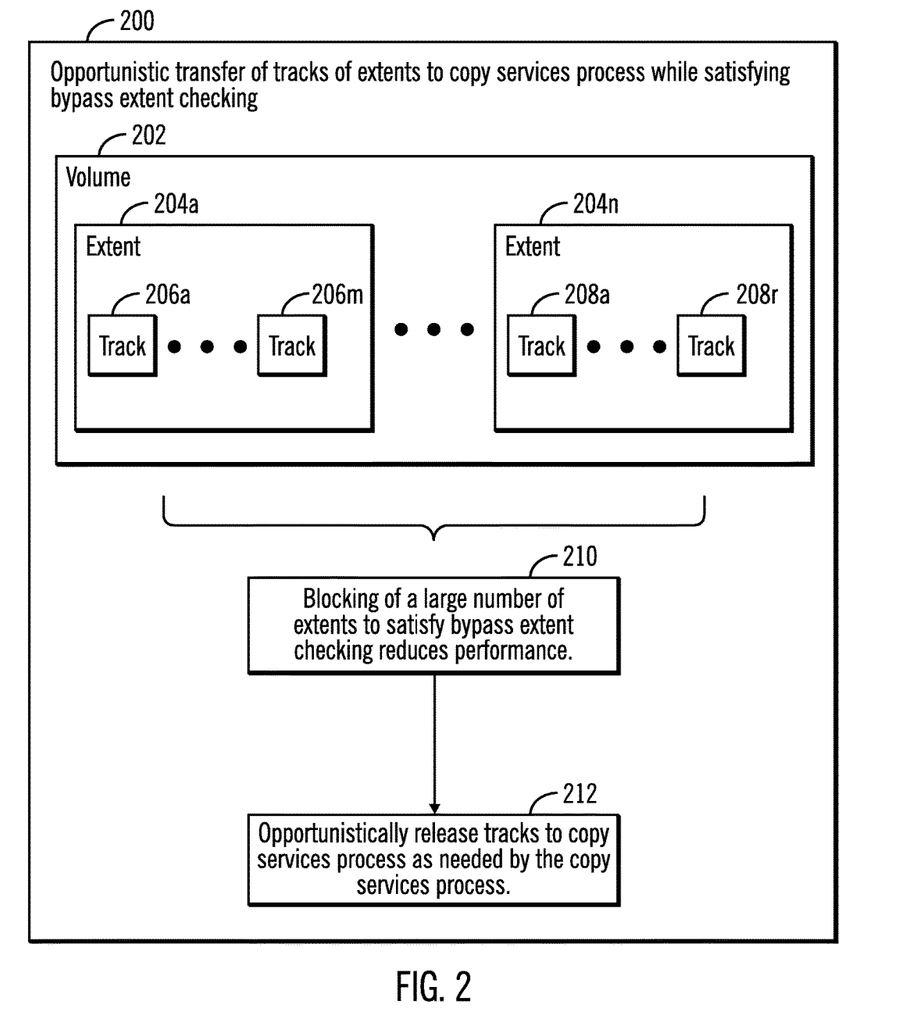
FIG. 2 illustrates a block diagram that shows opportunistic transfer of tracks of an extent to a copy services process, in accordance with certain embodiments.

FIG. 2 illustrates a block diagram 200 that shows opportunistic transfer of tracks of an extent to a copy services process while satisfying bypass extent checking requests, in accordance with certain embodiments.

FIG. 2 shows an exemplary volume 202 that comprises a plurality of extents 204a . . . 204n, where each extent may be many megabytes or gigabytes in size. Each extent comprises a plurality of tracks, such as tracks 206a . . . 206m, 208a . . . 208r, where each track may be several kilobytes in size. The sizes of the tracks and extents may be different in different embodiments. However the size of an extent is considerably larger than the size of a track.

In certain embodiments blocking of a large number of extents to satisfy bypass extent checking requests reduces system performance (as shown by block 210). Therefore, certain embodiments allow the host I/O process 118 to opportunistically release a track of an extent to the copy services process 120, when the tracks is needed by the copy services process 120 but is no longer needed by the host I/O process 118 (as shown by block 212).

Figure 3:
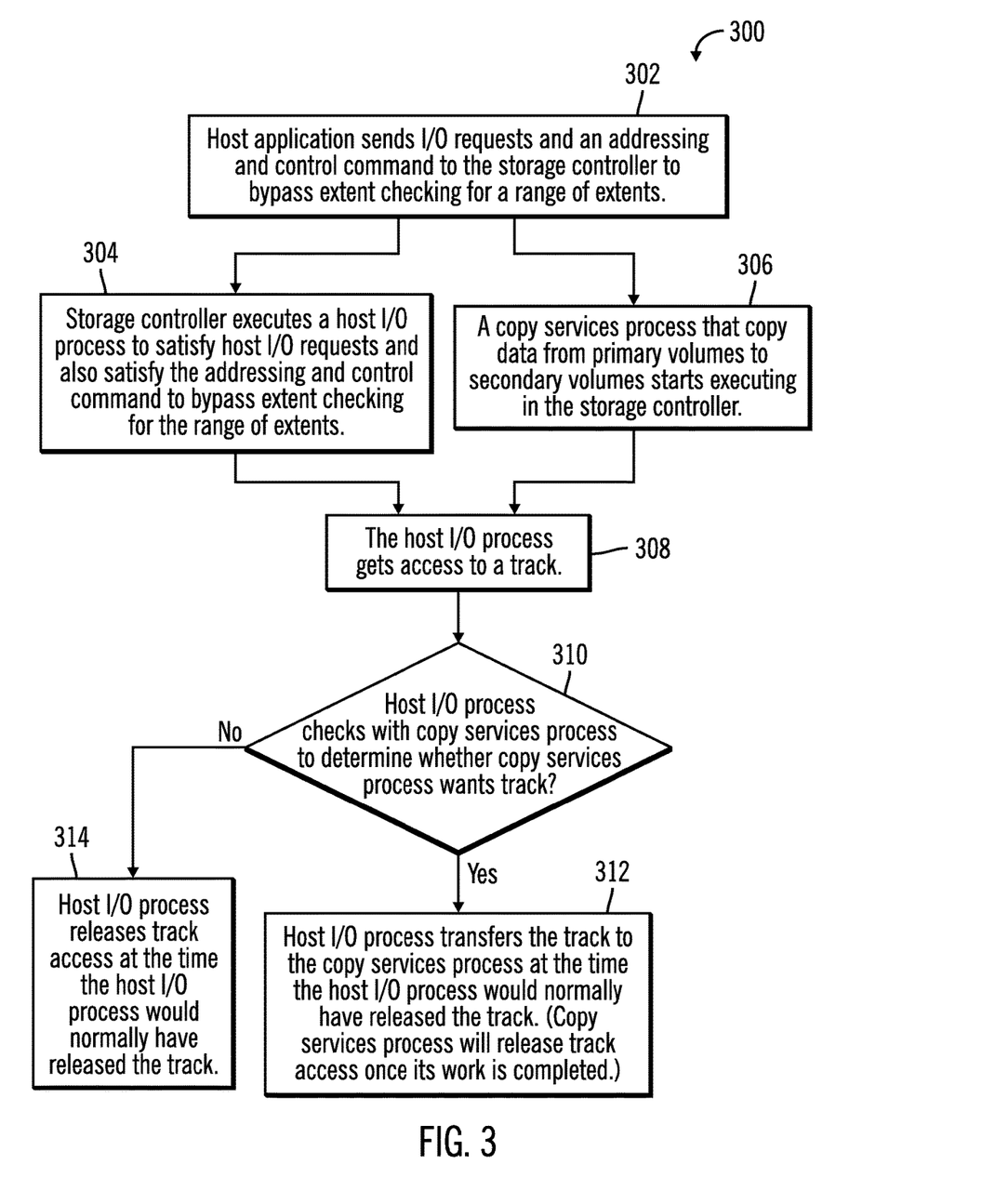
FIG. 3 illustrates a first flowchart for the management of extent conflict checking bypass, in accordance with certain embodiments.

FIG. 3 illustrates a first flowchart 300 for the management of extent conflict checking, in accordance with certain embodiments. The operations shown in FIG. 3 may be performed at least by the host I/O process 118 executing in the storage controller 102 in coordination with the host 106.

Control starts at block 302, in which a host application 108 sends I/O requests and an addressing and control command 120 to the storage controller 102 to bypass extent checking for a range of extents 119. The storage controller 102 executes (at block 304) a host I/O process 118 to satisfy the host I/O requests and also satisfy the addressing and control command 120 to bypass extent checking for the range of extents 119. In parallel to block 304, a copy services process 120 that copies data from primary storage locations to secondary storage locations starts executing in the storage controller 102.

Control proceeds to block 308, in which the host I/O process 118 gets access to a track. In block 310 a determination is made by the host I/O process 118, based on a response from the copy services process 120, as to whether the copy services process 120 wants the track. If so, then the host I/O process 118 transfers (at block 312) the track to the copy services process 120 at the time the host I/O process 118 would normally have released the track, and subsequently the copy services process 120 releases track access once its work is completed. If not, then the host I/O process 118 releases (at block 314) the track access at the time the host I/O process 118 would normally have released the track.

Therefore, FIG. 3 shows operations by which the host I/O process 118 opportunistically transfers tracks to the copy services process 120, rather than block entire tracks in order to satisfy bypass extent checking requests.

Figure 4:
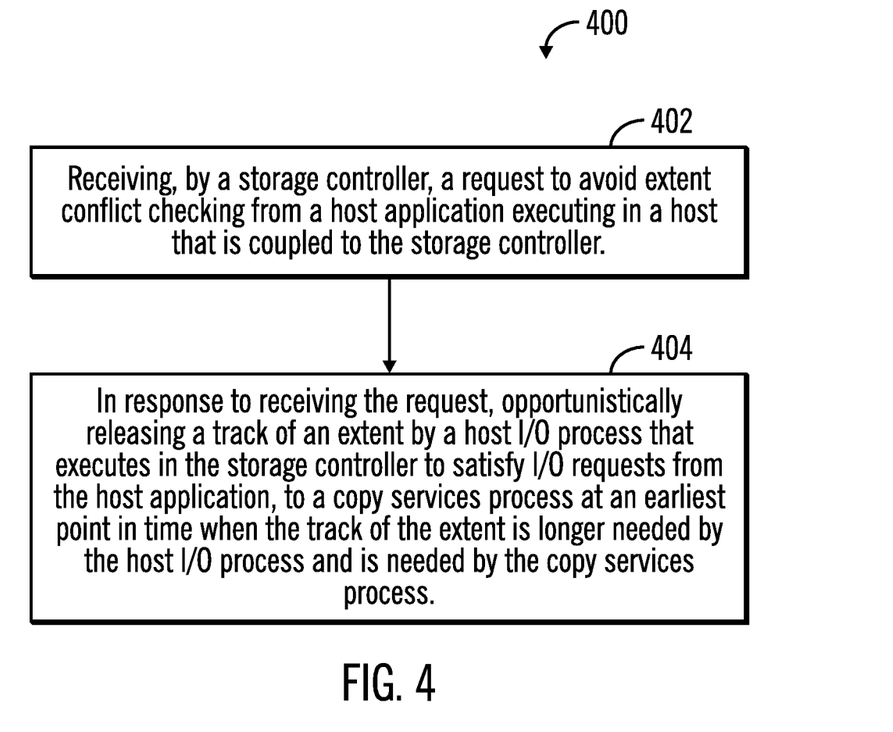
FIG. 4 illustrates a second flowchart that shows second operations for the management of extent conflict checking bypass, in accordance with certain embodiments.

FIG. 4 illustrates a second flowchart 400 that shows second operations for the management of extent conflict checking bypass, in accordance with certain embodiments. The operations shown in FIG. 4 may be performed at least by the host I/O process 118 executing in the storage controller 102.

Control starts at block 402, in which a storage controller 102 receives a request to avoid extent conflict checking from a host application 108 executing in a host 106 that is coupled to the storage controller 102. In response to receiving a request, a host I/O process 118 that executes in the storage controller to satisfy I/O requests from the host application 108 opportunistically releases (at block 404) a track of an extent to a copy services process 120 at an earliest point in time when the track of the extent is longer needed by the host I/O process 118 and is needed by the copy services process 120.

Therefore, FIGS. 1-4 illustrate certain embodiments in which by operating at the granularity of a track and transferring tracks opportunistically from the host I/O process to the copy services process, the performance of the storage controller 102 is improved in comparison to the situation where the entirety of extents are blocked by the storage controller to satisfy bypass extent checking requests from the host.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
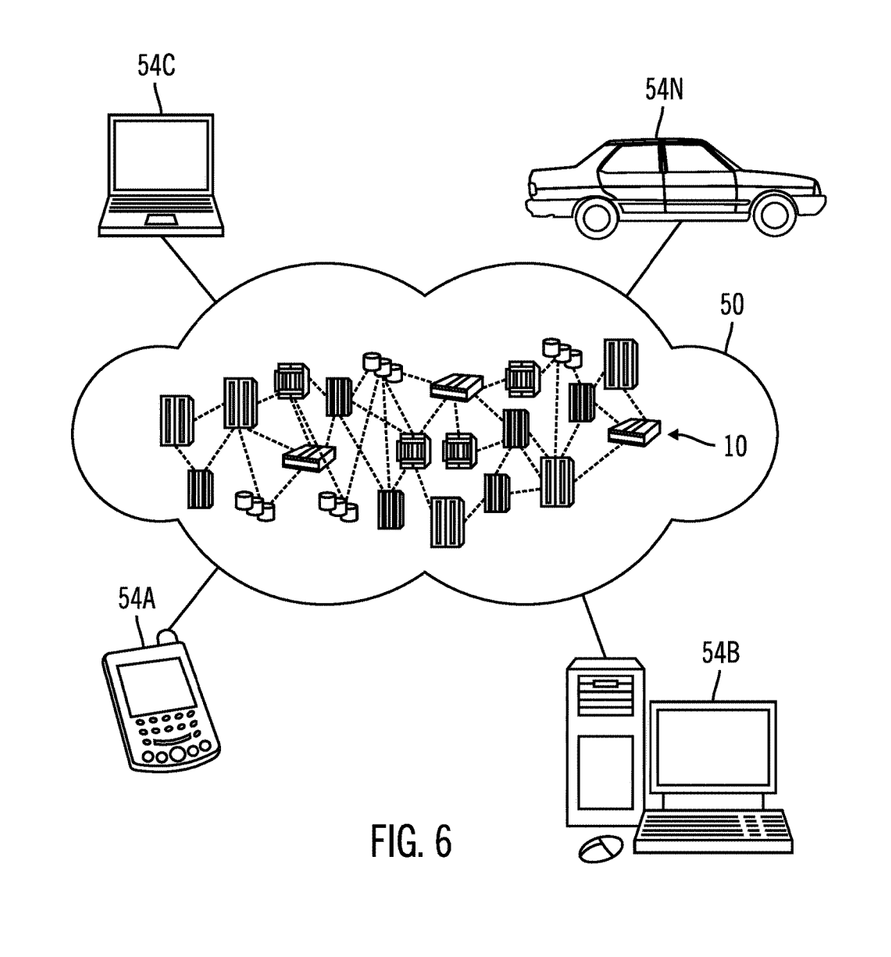
FIG. 6 illustrates a block diagram of a cloud computing environment, in accordance with certain embodiments.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
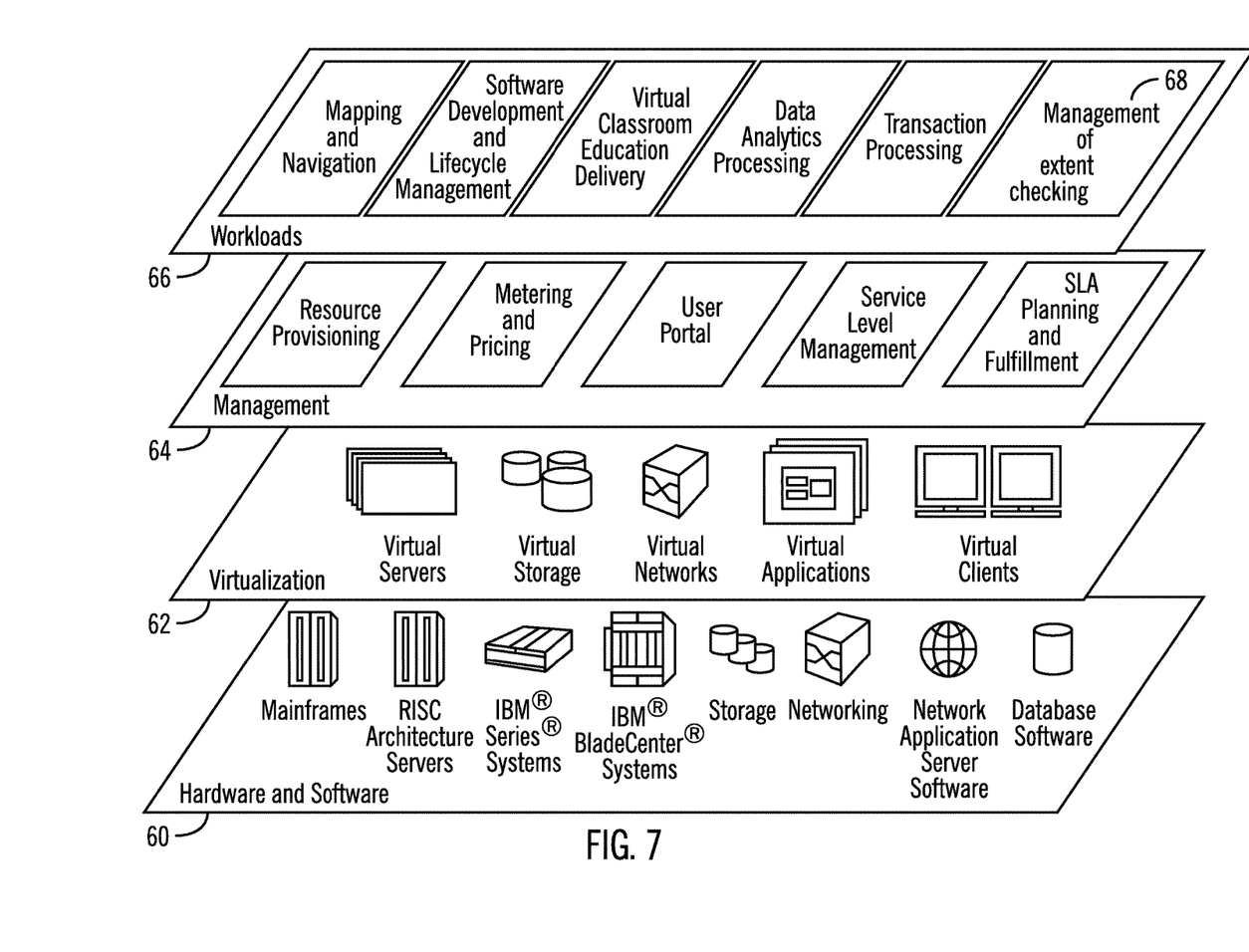
FIG. 7 illustrates a block diagram of further details of the cloud computing environment of FIG. 6, in accordance with certain embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and management of extent checking 68 as shown in FIGS. 1-4.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java, JavaScript are trademarks or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
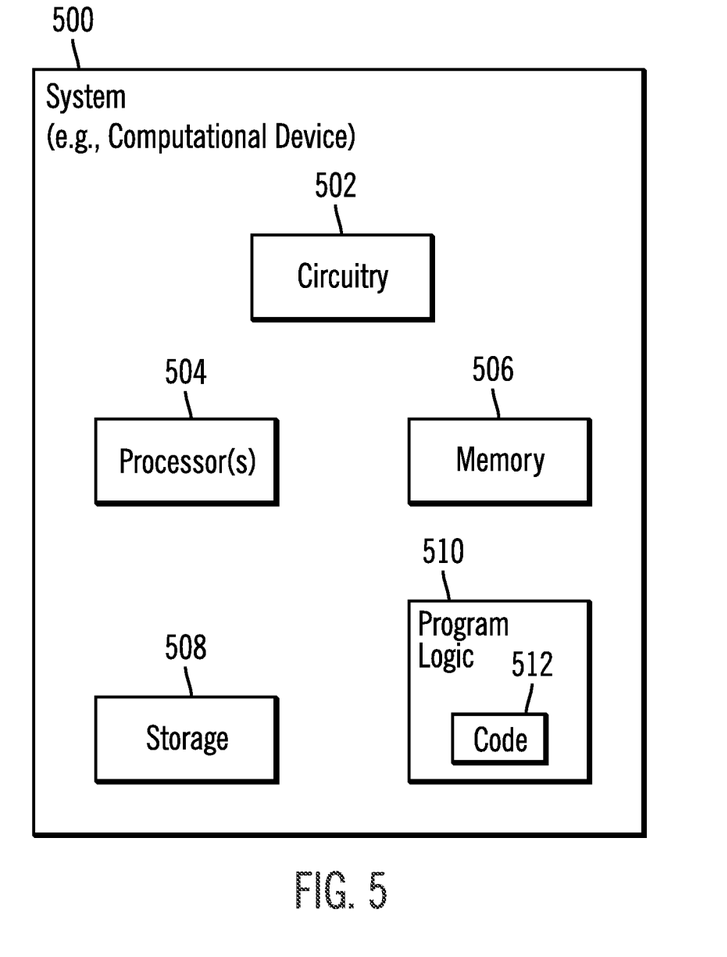
FIG. 5 illustrates a block diagram of a computational system that shows certain elements that may be included in the storage controller of FIG. 1, in accordance with certain embodiments.

FIG. 5 illustrates a block diagram that shows certain elements that may be included in the storage controller 102 in accordance with certain embodiments. The system 500 (e.g., the storage controller 102) may include a circuitry 502 that may in certain embodiments include at least a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising;
receiving, by a storage controller, a request to avoid extent conflict checking; and
in response to receiving the request to avoid extent conflict checking, releasing a track of an extent by a host I/O process to a copy services process at a point in time when the track of the extent is no longer needed by the host I/O process and is needed by the copy services process.

2. The method of claim 1, the method further comprising:
querying, by the host I/O process, the copy services process to determine whether the copy services process needs the track of the extent.

3. The method of claim 2, the method further comprising:
in response to receiving an indication that the copy services process needs the track of the extent and determining that the track is no longer needed by the host I/O process, transferring, by the host I/O process, the track to the copy services process for processing.

4. The method of claim 3, wherein by transferring tracks opportunistically from the host I/O process to the copy services process, an entire extent is not blocked while satisfying extent conflict checking within an extent range.

5. The method of claim 4, wherein:
the storage controller manages a plurality of Count Key Data (CKD) disks that are logically represented as volumes, wherein each volume includes a plurality of extents, and wherein each extent includes a plurality of tracks.

6. The method of claim 5, the request to avoid extent conflict checking from a host application is received via an addressing and control command that includes an extent range within which extent conflict checking is to be avoided.

7. The method of claim 6 wherein the copy services command is a continuous mirror command that copies storage volumes from a first location to a second location.

8. A storage controller communicatively coupled to a host, the system comprising:
a memory; and
a processor coupled to the memory, wherein the processor performs operations, the operations comprising:
receiving a request to avoid extent conflict checking; and
in response to receiving the request to avoid extent conflict checking, releasing a track of an extent by a host I/O process to a copy services process at a point in time when the track of the extent is no longer needed by the host I/O process and is needed by the copy services process.

9. The storage controller of claim 8, the operations further comprising:
querying, by the host I/O process, the copy services process to determine whether the copy services process needs the track of the extent.

10. The storage controller of claim 9, the operations further comprising:
in response to receiving an indication that the copy services process needs the track of the extent and determining that the track is no longer needed by the host I/O process, transferring, by the host I/O process, the track to the copy services process for processing.

11. The storage controller of claim 10, wherein by transferring tracks opportunistically from the host I/O process to the copy services process, an entire extent is not blocked while satisfying extent conflict checking within an extent range.

12. The storage controller of claim 11, wherein:
the storage controller manages a plurality of Count Key Data (CKD) disks that are logically represented as volumes, wherein each volume includes a plurality of extents, and wherein each extent includes a plurality of tracks.

13. The storage controller of claim 12, the request to avoid extent conflict checking from a host application is received via an addressing and control command that includes an extent range within which extent conflict checking is to be avoided.

14. The storage controller of claim 13 wherein the copy services command is a continuous mirror command that copies storage volumes from a first location to a second location.

15. A computer program product, the computer program product comprising:
a computer readable storage medium having computer readable program code embodied therewith, the computer readable program code configured to perform operations on a processor, the operations comprising:
receiving, by a storage controller, a request to avoid extent conflict checking; and
in response to receiving the request to avoid extent conflict checking, releasing a track of an extent by a host I/O process to a copy services process at a point in time when the track of the extent is no longer needed by the host I/O process and is needed by the copy services process.

16. The computer program product of claim 15, the operations further comprising:
querying, by the host I/O process, the copy services process to determine whether the copy services process needs the track of the extent.

17. The computer program product d of claim 16, the operations further comprising:
in response to receiving an indication that the copy services process needs the track of the extent and determining that the track is no longer needed by the host I/O process, transferring, by the host I/O process, the track to the copy services process for processing.

18. The computer program product of claim 17, wherein by transferring tracks opportunistically from the host I/O process to the copy services process, an entire extent is not blocked while satisfying extent conflict checking within an extent range.

19. The computer program product of claim 18, wherein:
the storage controller manages a plurality of Count Key Data (CKD) disks that are logically represented as volumes, wherein each volume includes a plurality of extents, and wherein each extent includes a plurality of tracks.

20. The computer program product of claim 19, the request to avoid extent conflict checking from a host application is received via an addressing and control command that includes an extent range within which extent conflict checking is to be avoided.

\* \* \* \* \*